US012579167B2

(12) United States Patent
Bar Yacov et al.

(10) Patent No.: US 12,579,167 B2
(45) Date of Patent: Mar. 17, 2026

(54) DISTRIBUTED GRAPH-BASED CLUSTERING

(71) Applicant: PAYPAL, INC., San Jose, CA (US)

(72) Inventors: Tom Bar Yacov, Binyamina (IL);
Omer Ornan, Maale Adumim (IL);
Ben Rahamim, Ashdod (IL); Inbal Honigman, Tel Aviv District (IL)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/640,945

(22) Filed: Apr. 19, 2024

(65) Prior Publication Data

US 2024/0386034 A1 Nov. 21, 2024

Related U.S. Application Data

(60) Provisional application No. 63/461,232, filed on Apr. 21, 2023.

(51) Int. Cl.
*G06F 7/00* (2006.01)
*G06F 16/28* (2019.01)
(52) U.S. Cl.
CPC .................................. *G06F 16/285* (2019.01)

(58) Field of Classification Search
CPC ...................................................... G06F 16/285
USPC ................................................... 707/600–899
See application file for complete search history.

(56) References Cited

U.S. PATENT DOCUMENTS

2012/0310916 A1* 12/2012 Abadi ............... G06F 16/24542
707/E17.017

* cited by examiner

*Primary Examiner* — Isaac M Woo
(74) *Attorney, Agent, or Firm* — Greenberg Traurig, LLP

(57) ABSTRACT

Systems and methods for identifying patterns in data including determining a set of first attributes for a first dataset corresponding to a plurality of vertices, performing a first join operation based on the set of first attributes, classifying the first dataset to a collection of buckets based on the set of first attributes, each respective bucket including one or more vertices of the plurality of vertices, determining, for a respective bucket, a set of second attributes, performing a second join operation on the set of second attributes to generate a second dataset, and determining a cluster based on applying a first threshold to the second dataset, the cluster including one or more respective vertices in the second dataset exceeding the first threshold. The first threshold corresponding to a minimum number of vertices within a distance parameter of a given vertex.

20 Claims, 6 Drawing Sheets

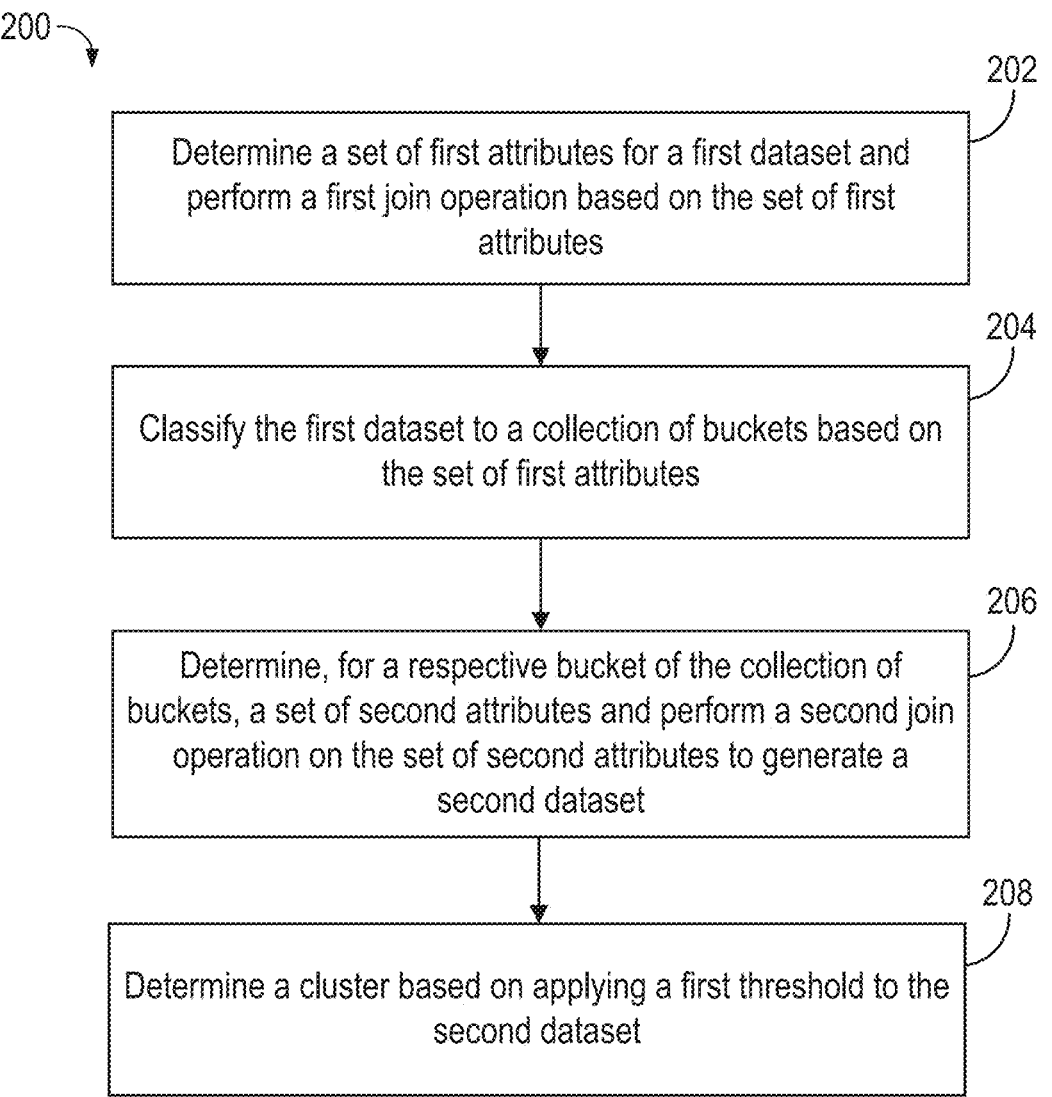

200

202
Determine a set of first attributes for a first dataset and perform a first join operation based on the set of first attributes 204
Classify the first dataset to a collection of buckets based on the set of first attributes 206
Determine, for a respective bucket of the collection of buckets, a set of second attributes and perform a second join operation on the set of second attributes to generate a second dataset 208
Determine a cluster based on applying a first threshold to the second dataset

FIG. 5

DISTRIBUTED GRAPH-BASED CLUSTERING

TECHNICAL FIELD

The present disclosure relates to the field of multivariate datasets. More particularly, to identifying and grouping multivariate datasets using graph-based clustering techniques.

BACKGROUND

Density-based clustering is typically used to identify one or more clusters from a dataset based on a location of each data point relative to the other data points and abstracting meaningful information from the identified clusters. For instance, density-based clustering can be applied to commercial transaction data for bot identification and to identify suspicious behavior such as, for example, identity theft, credit card theft, or the like. Density-based clustering enables dataset analysis and identification of core points corresponding to a cluster based on a minimum number of other data points located within a target distance. Data points that fall outside of these parameters are filtered as noise. However, density-based clustering has limitations based on the size of the dataset. Accordingly, as the dataset is scaled, density-based clustering can require additional processing resources to process larger datasets and the processing time required to perform the distance query can become a limitation.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 5 depicts a flow diagram of an example computer-implemented method for identifying clusters, according to some embodiments.

DETAILED DESCRIPTION

Figure 1:
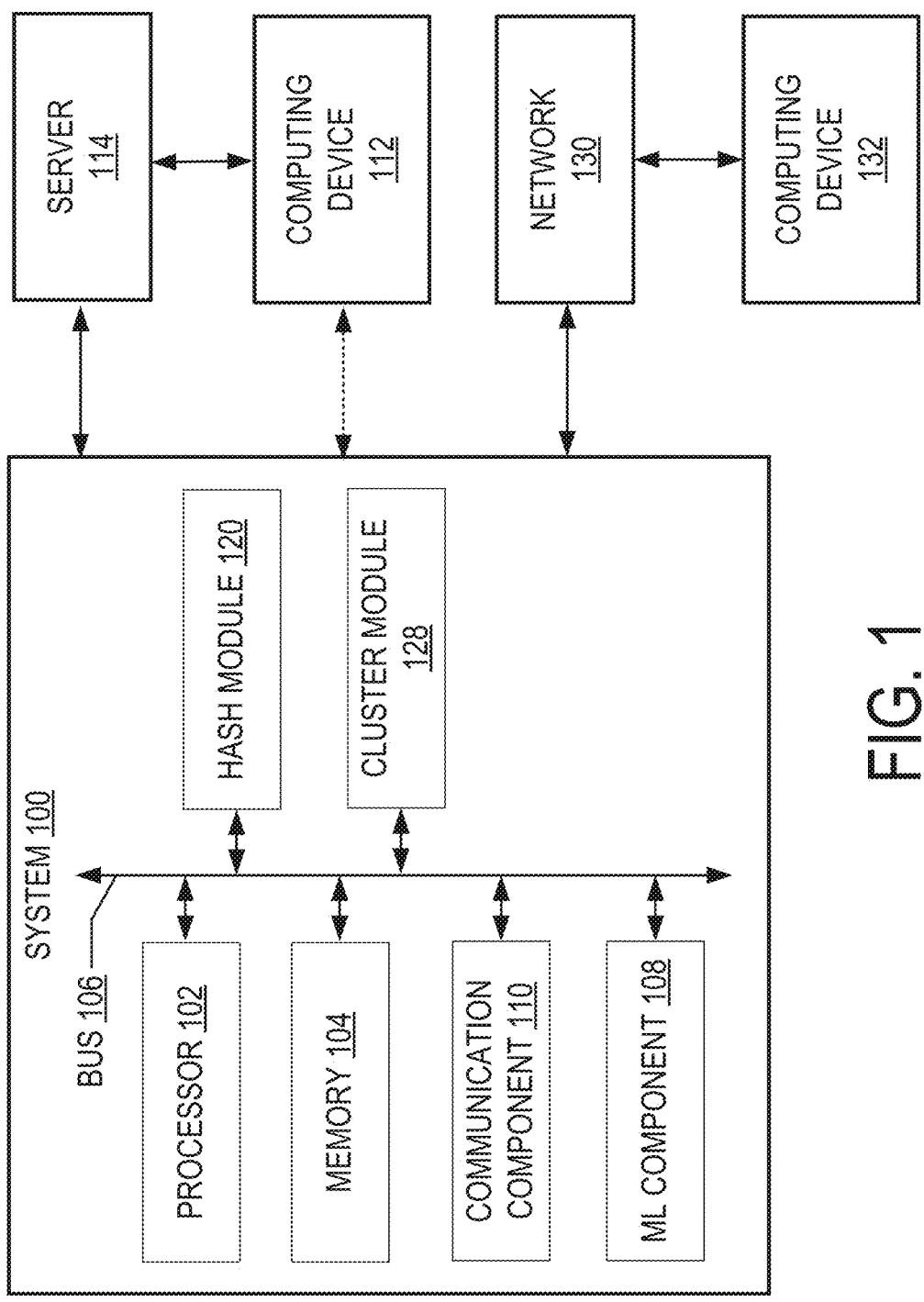
FIG. 1 depicts an example system, according to some embodiments.

Data associated with an entity such as, for example, online transaction data of a merchant may be analyzed by applying one or more clustering techniques to identify meaningful patterns within the data for various insights such as, for example, in order to gain a better understanding of user behavior. To perform the cluster identification, the data is distributed in a graph based on the attributes associated with the data. Based on the distribution, one or more clusters may then be identified from the data. For example, clusters may be determined based on a density of the distribution of the data points in the graph. Accordingly, the data clustering techniques may be leveraged by the entity to infer various insights that can help drive the business logic of the entity.

Various embodiments of the present disclosure are directed to systems, apparatuses, computer-implemented methods, and/or computer-program products capable of performing cluster identification on datasets while overcoming processing bottlenecks that traditionally occur from performing pattern identification on datasets having a large number of data points and/or data having high dimensionality feature data. Various embodiments herein include a system that identifies one or more clusters in datasets based on applying one or more hash functions to determine a hash value corresponding to a locality of each data point and to classify each data point to a respective bucket of a collection of buckets based on the hash value in order to increase the probability of collisions between data points. Each bucket may be partitioned to one or more processing devices to optimally manage a distribution of the processing load for associating one or more attributes to the data and for performing the cluster identification on the data, as will be further described herein. In this regard, the various embodiments herein may be capable of obtaining large datasets or datasets having high dimensionality data and performing an efficient distribution of the data to available processing resources using one or more hash functions and based on classifying the data in order to increase the probability of collisions of the data to perform the clustering identification.

In one non-limiting example, the data may include user behavior data that may be leveraged to identify patterns in user transactional behaviors. In another non-limiting example, the data may be leveraged to detect instances of suspicious user behavior like scams, identify theft, credit card theft, and other suspicious transactional behaviors. It is to be appreciated by those having ordinary skill in the art that the application of data clustering techniques is not intended to be limiting and may be used in any of a plurality of applications capable of identifying patterns in data in accordance with this disclosure.

Various embodiments of the present disclosure may include leveraging one or more neural network models and applying one or more algorithms to data to perform operations including, but not limited to, determining a locality of respective data points in the datasets (e.g., determine vertices), applying one or more functions to the vertices to determine attributes of the data, classifying vertices to respective buckets in the collection of buckets, determining a cluster based on the data and the corresponding attributes of the data in a respective bucket, grouping the data into one or more clusters based on the hashing, or any combinations thereof. In addition, in some embodiments, determining the attributes of the data may include, but is not limited to, determining a locality of the data points (e.g., vertices) in the dataset, determining a hash value for the vertices, determining edges between vertices, determining a source degree of the vertices based on the respective edges, determining a cluster in the respective buckets, or any combinations thereof.

In various embodiments, the neural network models may be utilized to predict the functions to apply to data based on a feature set associated with the data. For example, in some embodiments, the neural network model may predict, based on the feature set of the data, one or more hash functions to apply to data to allocate the data points to a respective bucket of the collection of buckets. In this regard, based on the data features, the neural network model predicts a number of the one or more functions to apply to data to perform the clustering. The neural network models may be trained utilizing a data driven approach. That is, the neural network models may be trained on a training dataset to predict the number of hash functions to apply to the data based on a feature set of the data. The training dataset used to train the neural network models may include a large number of samples, the samples being run with a number of respective hash functions, in an un-supervised way, based on the feature set associated with the data points in the training data. The features of the data may include, but is not limited to, the number of data points, the epsilon chosen, skewness measures (e.g., histograms and statistic measures such as Pearson's moment of skewness), number of dimensions, statistics regarding the spread across dimensions, other features, or any combinations thereof. In some embodiments, the neural network architecture may be a fully connected neural network, with several layers. The trained neural network model may then be leveraged to determine a number of functions to apply to data to identify patterns and corresponding relationships in the data that are indicated by the graph clusters. In some embodiments, the neural network model may be an unsupervised model trained to learn an optimal number of functions to apply to the data points in the dataset. For example, the model may have been trained during a research phase to learn the optimal number of hash functions to apply to the data to allocate the data points to the respective buckets of the collection of buckets.

The various embodiments include one or more techniques and methodologies providing improvements in efficient processing of datasets to perform the pattern identification, the datasets ranging in size from small datasets to larger datasets having millions or hundreds of millions of data points. The various embodiments also provide improvements by efficiently determining the number of functions to apply to data points to perform the pattern identification as compared with brute force hashing methods that use a fixed number of hash functions. That is, the number of hash functions applied to data points is traditionally a hard-coded, pre-defined number, such that applying the pre-defined number of hash functions to all the points in the dataset can be computationally burdensome and leads to bottlenecking. For example, 20 pre-defined hash functions can be calculated for each data point in a dataset that include millions or hundreds of millions of data points, thereby potentially reaching an order of magnitude of billions of calculations. By predicting the number of functions to apply to data based on the feature set of the data, the various embodiments decrease computation time, provides faster solutions with less iterations, provides more dynamic, data-suiting parameters for a given dataset, and mitigates loss of prediction accuracy due to changes in the data. For example, a number of hash functions applied to a first dataset having high dimensionality features may be less than the number of hash functions applied to a second dataset having less features. In addition, for data which requires more than the pre-determined number of functions, more accurate solution may be provided.

As set forth below, the various embodiments of the present disclosure overcome various limitations of the prior art and provides improved computational efficiency in processing data, thereby resulting in increased speed and performance in the processing of data such as in identifying patterns in the data, and/or otherwise imparts innovations consistent with the disclosed technology via the systems or methods described herein that determines a number of the one or more functions to apply to the data points in a dataset, determines a vertex for each data point, classifies the vertices to a collection of buckets based on the hashing, determines edges between the vertices allocated to a respective bucket of the collection of buckets, extracts one or more outliers corresponding to vertices from each respective bucket of the collection of buckets based on the edges and/or source degree and based on a threshold, identifies one or more clusters based on the vertices remaining in the collection of buckets, other operations, or any combinations thereof. Accordingly, the various embodiments herein can improve computer performance by providing more efficient applications for performing cluster identification of data based on more efficient distribution of processing resources, leading to decreasing the demand for processing resources to process a given volume of data, saving processor cycles, memory usage, and power usage. The various embodiments herein can also efficiently identify patterns in data associated with the entity compared to other methods, thereby improving the identification of patterns based on data such as detecting instances of suspicious user behavior like scams, identify theft, credit card theft, and other suspicious transactional behaviors.

The various embodiments of the present disclosure improve upon other known methods that can experience processing bottlenecks while performing the distance querying and cluster identification for large datasets and/or datasets that include high feature data. For example, a dataset having 10 million data points of high dimensionality feature data as input. As the amount of data for performing density-based clustering is scaled, the traditional density-based clustering techniques generally require greater number of processing resources to handle the increased amount of data. Additionally, such large datasets also require increased processing time to perform the distance querying. Consequently, existing density-based clustering techniques may not be capable of efficiently processing such large datasets and can fail due to the increased demand.

It should be appreciated that additional manifestations, configurations, implementations, protocols, etc. can be utilized in connection with the following components described herein or different/additional components as would be appreciated by one skilled in the art. However, not all of these components may be required to practice one or more embodiments, and variations in the arrangement and type of the components may be made without departing from the spirit or scope of various embodiments of the present disclosure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

FIG. 1 illustrates a non-limiting example of a system 100, according to some embodiments. System 100 may be a computerized tool (e.g., any suitable combination of computer-executable hardware and/or computer-executable software) which can be configured to perform cluster identification on datasets to identify meaningful patterns within the dataset. The system 100 may include one or more of a variety of components, such as a processor 102, memory 104, bus 106, machine learning (ML) component 108, and a communication component 110. The processor 102, memory 104, Model component 108, and/or communication component 110, may be communicatively or operably coupled (e.g., over a bus or wireless network) to one another to perform one or more functions of the system 100. In some embodiments, the system 100 may include one or more of the processor 102, memory 104, bus 106, Model component 108, the communication component 110, or any combination thereof.

The system 100 may obtain a dataset including one or more data points. In some embodiments, the dataset may include one or more unvisited data points. In other embodiments, the dataset may also include one or more visited data points. As used herein, the term "visited" refers to data points that have had one or more algorithms or one or more hash functions applied to said data points to determine whether said data point is part of a cluster. Accordingly, unvisited data corresponds to data points that have not been processed using a cluster identification technique.

The data is associated with an entity and may be processed by the system 100 using the various techniques described herein to identify one or more clusters corresponding to patterns in the data. As such, the one or more clusters identified from the data may be associated with a function of the entity such as, for example, detecting fraudulent credit card transactions. In some embodiments, the dataset may be indicative of a user behavior. In other embodiments, the dataset may be indicative of a user transaction history. For example, the dataset may be indicative of user financial transaction data, credit data, spending data, credit card data, web-based application data logs, and the like. In some embodiments, the data may be indicative of a bot identification, to identify suspicious user behavior, to identify identity theft, to identify credit card theft, other like behaviors, or any combinations thereof. It is to be appreciated by those having ordinary skill in the art that the type of data is not intended to be limiting and may include any of a plurality of other types of data that can enable a merchant to understand trends in user actions based on such data in accordance with the present disclosure.

The system 100 obtains the dataset and the system 100 may then store the data in a data store of the memory 104 for use by the other components of the system 100. In some embodiments, the memory 104 may be a non-transitory computer readable media having stored thereon instructions executable by the system 100 to perform various operations as discussed herein. In some embodiments, the dataset may be obtained from an external computing device. In some embodiments, the dataset may be obtained from a data store electrically communicable with the system 100. In other embodiments, the data may be obtained from a web browser application associated with the external computing device.

The system 100 may include data corresponding to an Model component 108. The Model component 108 may be configured to process a dataset by applying the methods and techniques as described herein to identify clusters in the dataset. The system 100 may utilize the Model component 108 to facilitate learning improved clustering processes, context-based behavior, scenarios, preferences, etc. in order to facilitate taking automated action with high degrees of confidence. The Model component 108 may apply a utility based analysis to factor the benefit of taking an action against cost of taking an incorrection action. The Model component 108 may also apply a probabilistic or statistical-based analysis in connection with the foregoing and/or the following as will be further described herein.

The model component 108 may apply one or more techniques to data for the system 100 to perform cluster identification from said data. The model component 108 may include one or more neural network models that may be leveraged to perform the operations consistent with the present disclosure. The model component 108 may leverage the neural network models to predict one or more functions to apply to the data. For example, the model component 108 may apply the neural network model to a dataset, the neural network model predicting one or more functions to be applied to a dataset. The model component 108 may also utilize the neural network models to apply the respective functions to the data to, for example, determine a locality of each data point in the dataset within a graphical space, determine edges between data points, determine source degrees for each data point in the dataset, and other like operations. Additionally, the model component 108 may be applied to classify each data point in the dataset, where each data point can be allocated to a respective bucket in a collection of buckets to distribute a processing load for performing the cluster identification, as will be further described herein.

In some embodiments, the model component 108 may apply one or more functions to the dataset. In some embodiments, the one or more functions includes the one or more hash functions. In some embodiments, the one or more hash functions may correspond to a locality sensitive hashing ("LSH"), where each data point is allocated to a respective bucket of a collection of buckets based on an estimation of increased probability of collisions between the data points in the respective bucket or respective set of buckets.

The system 100 may be in electrically communicable connection with a computing device 112. The computing device 112 may also be a computerized tool (e.g., any suitable combination of computer-executable hardware and/or computer-executable software) each including one or more processors and one or more memories which can be configured to perform various operations relating to performing the cluster identification techniques in accordance with this disclosure. The computing device 112 may be associated with a respective bucket of the collection of buckets for performing the cluster identification based on the data allocated to the respective bucket or buckets.

The system 100 may include the communication component 110. The communication component 110 can send and receive data between the one or more components of the system 100. The communication component 110 may also enable the system 100 to send and receive data between system 100 and other external computing devices, such as computing device 112. In some embodiments, the communication component 110 can send and receive one or more datasets to computing device 112 for distribution of processing loads for performing the clustering identification techniques of the present disclosure.

It can be appreciated that the communication component 110 can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.) The system 100 and/or various respective components can additionally comprise various graphical user interfaces (GUIs), input devices, or other suitable components.

The system 100 may be in electrically communicable connection with server 114. In some embodiments, the system 100 may be in communicable connection with the computing device 112 or one or more other systems similar to system 100, through server 114.

Figure 2:
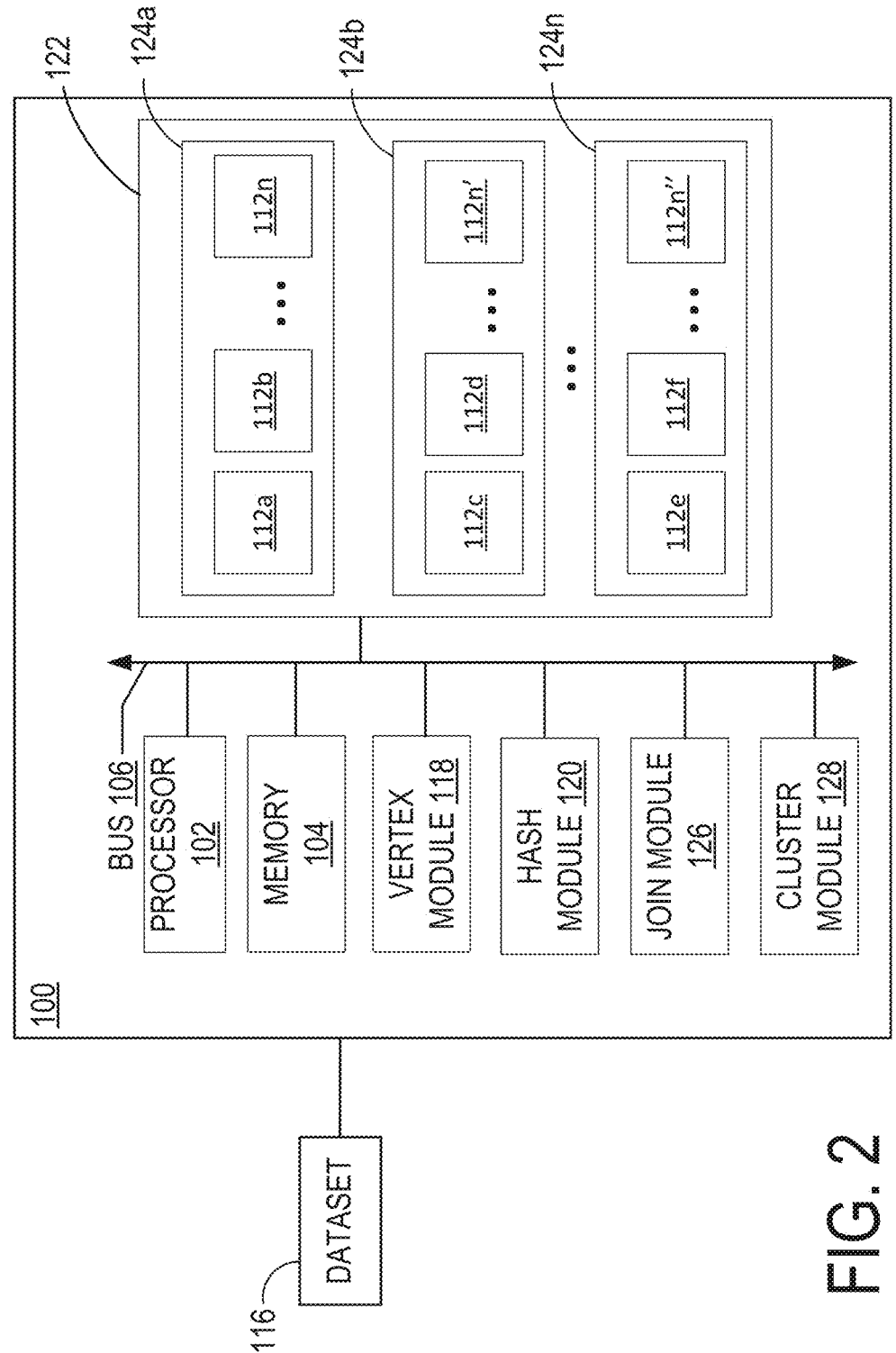
FIG. 2 depicts a block diagram of the system of FIG. 1, according to some embodiments.

FIG. 2 illustrates a block diagram of the system 100, according to some embodiments. The system 100 obtains a dataset 116 including one or more data points. In some embodiments, the dataset 116 may include millions, or tens of millions, of data points. The system 100 may perform operations on the dataset 116 using one or more modules for performing a cluster identification to identify patterns based on the dataset 116. Using the one or more modules, the system 100 may also apply one or more techniques and one or more algorithms to the data of dataset 116 to determine a set of attributes associated with the datapoints of dataset 116. In some embodiments, for each data point, the attributes may include a vertex, hash value, edge, source degree, partition, other attributes, or any combinations thereof. In some embodiments, the system 100 may determine one or more of the attributes for each data point in dataset 116 and perform a join operation to associate the attributes with each respective data point, as will be further described herein.

The system 100 includes a vertex module 118. The vertex corresponds to a locality of the data point based on representation of the dataset 116 in a graphical space. In some embodiments, the vertex for each data point may be determined by the system 100 based on the one or more features associated with each respective data point of dataset 116. For example, the system 100 may identify one or more similar features in a set of data points within dataset 116 and may determine the vertex for the set of data points in a close locality based on the corresponding similar features. As such, in some embodiments, the vertex may be based on a coordinate system. For example, the vertex may include coordinate data based on an x, y, and z axes. In this regard, a distance and vector, along with edges and degrees, may be determined between the vertices associated with the data points of dataset 116. In some embodiments, the system 100 may obtain the dataset 116 and the vertex module 118 may determine a vertex for each data point of dataset 116. In other embodiments, the dataset 116 may include attribute data associated with each data point including the vertex associated with each data point.

The system 100 may include a hash module 120. The hash module 120 may be configured to perform a hash function on the dataset 116. In some embodiments, the hash module 120 may be configured to perform one or more hash functions to each respective data point in the dataset 116. The hash module 120 determines a hash value for each data point or vertex of dataset 116 and associates the attribute with the respective data point. In this regard, the hash module 120 may be based on a locality of each data point or vertex and the attribute, e.g., hash value, is associated to the corresponding point. The hash value also is indicative of a prediction of an increased probability of collisions between points having the same hash value.

In some embodiments, the hash module 120 may identify a set of data points that are identified as being near each other in locality based on the associated hash value and the system 100 may then determine the edges connecting the set of data points. In some embodiments, the hash module 120 may also determine the edges between data points having the same hash value, as will be further described herein. The hash module 120 may be utilized to apply one or more functions to the data in dataset 116 to hash the data points into one or more buckets, such that the data points which are close to each other in the dataset 116 (e.g., indicative of a higher probability for collisions) have a high probability of being allocated to the same bucket, while data points that are far away from each other (e.g., indicative of a lower probability for collisions) have a high probability of being allocated to different buckets.

The system 100 may include a join module 126. The join module 126 performs a join operation on the data of dataset 116. The join module 126 may identify one or more distinctly named tables from the data of dataset 116 based on an application of a relational model to dataset 116, each table including one or more points from dataset 116 having one or more attributes associated therewith. For example, each data point may have associated therewith a set of attributes including the hash value indicative of the locality of the data point. In some embodiments, the system 100 may apply the join module 126 at one or more points during the cluster identification process to bolster the data tables with attributes determined by the system 100 for each respective data point and to enable the system 100 to perform the cluster identification.

Accordingly, based on the hash value, the join module 126 may perform a join operation on the dataset 116 to classify the data points into one or more sets of data based on allocating the dataset 116 into a collection of buckets 122. More particularly, each table includes one of the sets of data and is associated with one of the bucket 124 of the collection of buckets 122 based on the hashing. As such, each data point of dataset 116 is allocated to a respective one of the bucket 124 based on the locality respective to the other data of dataset 116, e.g., allocating data points that are close to each other to a respective bucket based on a prediction of the increased probability of collisions. Accordingly, data points having different hash values, e.g., points that may be far apart from each other, are assigned to different respective buckets of the collection of buckets 122.

The system 100 includes a collection of buckets 122. Each of the buckets 124 of the collection of buckets 122 may be associated with one or more of the computing devices 112 of a plurality of the computing device 112, where the computing device 112 associated with a respective one of the buckets 124 are partitioned from the plurality of the computing device 112 that may be associated with other buckets or being utilized for other applications. The computing devices 112 may be configured to perform one or more processing operations including the cluster identification on the set of data points allocated to the respective one of the buckets 124 as will be further described herein.

Referring to FIG. 2, in system 100, the collection of buckets 122 includes bucket 124a, bucket 124b, and through bucket 124n. The bucket 124a includes computing device 112a, computing device 112b, and through computing device 112n. The bucket 124b includes computing device 112c, computing device 112d, and through computing device 112n'. The bucket 124n includes computing device 112e, computing device 112f, and through computing device 112n". In some embodiments, bucket 124a, bucket 124b, and through bucket 124n may be collectively referred to as buckets 124. Additionally, the computing devices in the respective buckets 124 (e.g., computing device 112a through computing device 112n, computing device 112c through computing device 112n', and/or computing device 112e through computing device 112n") may collectively be referred to as computing devices 112.

In some embodiments, the dataset 116 may be a large dataset of unstructured data. Accordingly, the system 100 may be capable of parsing through the data based on hashing the dataset 116 using the modules described herein to distribute the points of dataset 116 to a respective bucket 124 of the collection of buckets 122. This enables the computing device 112 associated with the respective bucket 124 to process a smaller set of data compared to the entirety of dataset 116. Additionally, the set of data can be efficiently processed by the computing device 112 associated with the corresponding bucket 124 without bottlenecking occurring as a result of processing the large dataset of dataset 116. Furthermore, the system 100 and the computing device 112 may be optimally configured to identify clusters within the set of data allocated to the respective one of the bucket 124 as will be further described herein. For example, the dataset 116 may include both structured and unstructured data relating to financial transaction data and the system 100 may apply the one or more methods and techniques described herein to identify a first cluster of points from dataset 116 associated with fraudulent transactions and a second cluster of points from dataset 116 associated with completed user transactions based on user retargeting strategies. Accordingly, one or more patterns may be identified from a single dataset with minimal supervision based on data that can be seemingly incongruent at the superficial level. Furthermore, additional data may then be later obtained from the entity and the cluster identification techniques may be applied to this later data to either supplement the data of dataset 116. As such, in some embodiments, the process of identifying the data is associated with one of the clusters may be improved based on the existing identified clusters. In other embodiments, new clusters and patterns may be made based on the existing data of dataset 116 and the newly added data.

By distributing the data points of dataset 116 to the collection of buckets 122, the system 100 may optimally configure a processing demand across a plurality of processing machines (e.g., executors), thereby reducing a likelihood of bottlenecking due a single machine or group of machines performing the cluster identification on disproportionately large amounts of data. However, the dataset 116 may include areas having a high density of points or unnormalized data. Consequently, the allocation of the data to each respective bucket 124 and the processing of the data by the corresponding computing device 112 associated with the bucket 124 may become difficult due to the skewed data. As such, performing a cluster identification with the computing device 112 may experience increased delays due to the data skew (e.g., data with the same key being assigned to the same executors). This results in the computing device 112 associated with the corresponding bucket 124 working on a large amount of data while other computing device 112 associated with other buckets may be idle.

Accordingly, to avoid such data skew problems for occurring, the hash module 120 of the system 100 may allocate the data of dataset 116 uniformly across the collection of buckets 122. In some embodiments, the hash module 120 may also be configured to uniformly distribute the processing load across each of the computing device 112 for a particular one of the bucket 124. In some embodiments, the hash module 120 of the system 100 may apply a salting technique to uniformly distribute the data points of dataset 116 across the collection of buckets 122 and/or to each of the computing device 112 for a particular bucket 124. In some embodiments, the salting technique includes adding a random value or values to the hashing data to evenly push the allocation of the dataset 116 between the respective buckets 124 of the collection of buckets 122. For example, the salting technique may enable an even allocation of the data in dataset 116 to the bucket 124*a*, bucket 124*b*, and through bucket 124*n*. In some embodiments, the salting technique may also include a random value or values to the hashing data to push the data points to the respective computing device 112 of the computing devices 112 associated with the respective bucket 124. For example, the salting technique may enable an even allocation of the data in dataset 116 to the computing device 112*a*, computing device 112*b*, and through computing device 112*n* in the bucket 124*a*.

The system 100 may include a cluster module 128. The system 100 may apply the cluster module 128 to determine one or more attributes associated with each of the data points allocated to the collection of buckets 122. The cluster module 128 may determine the one or more attributes between data points allocated to a respective bucket 124. In some embodiments, cluster module 128 may cooperate with the computing devices 112 associated with the corresponding bucket 124 and utilize the computing device 112 to perform processing operations to determine the one or more attributes associated with each data point in the respective bucket 124 of the collection of buckets 122.

The cluster module 128 may determine one or more attributes for data in a dataset such as, for example, dataset 116. The attributes determined by the cluster module 128 may include edges between data points. In some embodiments, the cluster module 128 may determine one or more attributes for the data of dataset 116 that is allocated to a respective bucket 124 of the collection of buckets 122. In the respective bucket 124 of the collection of buckets 122, the cluster module 128 may determine edges 140 (FIG. 4) between the data points in the respective bucket 124.

In some embodiments, the attributes determined by the cluster module 128 may include a source degree of each data point. The source degree may also be referred to as the degree. The degree corresponding to a number of edges connecting a respective vertex to other vertices in a dataset. The degree of each vertex may be determined based on a threshold. That is, the degree may be the edges connecting a vertex to one or more other vertices that are within the threshold. In some embodiments, the threshold may be a distance parameter and the degree of a vertex includes those edges that connect the vertex to the other vertices and that are less than the distance parameter. That is, in some embodiments, in a respective bucket 124 of the collection of buckets 122, the cluster module 128 may determine the degree of each data point in the respective bucket 124.

The cluster module 128 may also determine a cluster based on the data points in the dataset 116. In some embodiments, the cluster module 128 may determine one or more clusters at the respective bucket 124 of the collection of buckets 122 based on the data points allocated to the bucket 124. In some embodiments, the cluster module 128 may determine the cluster at the respective bucket 124 based on a threshold, or cluster threshold. In some embodiments, the cluster threshold corresponding to a number of vertices within a distance parameter of a given vertex. That is, for a respective bucket 124, the cluster 154 (FIG. 4) includes those data points where the source degree 150 is greater than the cluster threshold (e.g., first threshold).

Accordingly, in some embodiments, the cluster module 128 may, for a given point in a dataset, utilize the one or more modules of system 100 to determine a distance between the data points in the dataset, determine edges connecting the data points, determine, for a given data point, the edges of the given point, and determine the source barrier based on a target distance (e.g., second threshold). For the given data point, if a total number of the edges (that is less than the target distance) is greater the cluster threshold (e.g., first threshold), the cluster module 128 may determine a new cluster including the given data point. In this regard, the cluster module 128 determines the cluster 154 (FIG. 4) based on the data points in the respective bucket 124 that exceed the first threshold. In addition, those data points that do not exceed the cluster threshold may then be extracted to result in a dataset for determining a directed graph cluster. It is to be appreciated by those having ordinary skill in the art that the attributes determined for the data points in the datasets are not intended to be limiting and may include one or more other attributes to enable the system 100 to perform the cluster identification in accordance with the present disclosure.

The system 100 may also apply the join module 126 to bolster the data in each data table with the one or more attributes determined based on the data in the respective bucket 124 of the collection of buckets 122. The system 100 accordingly may also perform a join operation on the data tables to associate the one or more attributes with the data points in the respective bucket 124. The system 100 may then utilize these data tables to identify one or more clusters based on the data tables. In some embodiments, the attributes may include, but is not limited to, vertices, cells, hash values, edges, source degrees, other attributes, or any combinations thereof. In this regard, each data table may be created around a potential seed, where each data table is representative of a directed or undirected cluster. Accordingly, the set of data tables derived from the collection of buckets 122 are representative of a forest (groups of trees) corresponding to the one or more clusters.

Figure 3:
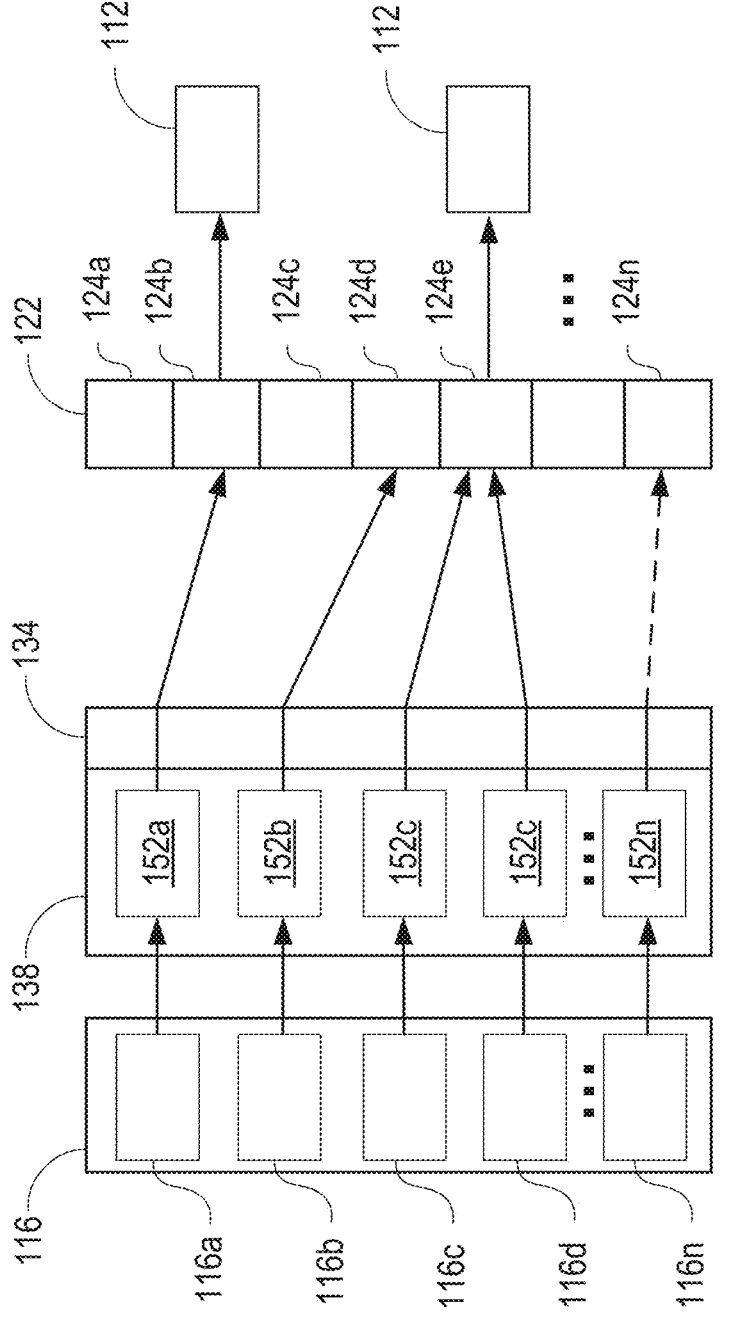
FIG. 3 depicts a block diagram of the system, according to some embodiments.

FIG. 3 illustrates a block diagram of a portion of the system 100, according to some embodiments. The dataset 116 may be data generated in system 100, another computing device such as, for example, computing device 112, or may be data generated based on one or more computing devices associated with users interacting with a computing network associated with the system 100. For example, the The dataset 116 obtained by the system 100 includes a plurality of dataset 136. The dataset 116 is associated with an entity. For example, the dataset 116 may correspond to transaction data generated based on one or more computing devices performing activities on a computing network associated an online merchant. In another non-limiting example, the data may be user data associated with one or more users of a computing network of an online entity. In another example, the data may be online user behavior data based on interactions between one or more users of a computing network of an entity. The dataset 116 may accordingly include any of a plurality of data having associated therewith related or seemingly unrelated features that can be processed using the one or more techniques or methodologies described herein to identify patterns based on the data features.

The system 100 obtains the dataset 116. The system 100 may apply hash function 138 to each data point in the dataset 116 to determine a hash value 152 for each data point in the dataset 116. In some embodiments, the hash function 138 may include one function. In other embodiments, the hash function 138 may include one or more functions. In some embodiments, the hash function 138 may be applied to determine a hash value 152 for each respective data point. In addition, in some embodiments, the hash function 138 may be applied to determine edges connecting the respective data point to other data points in a locality near the respective data point.

The system 100 may determine which hash function 138 to apply to the dataset 116 based on a feature set of the data in dataset 116. The dataset 116 includes data point 116a through data point 116n. As such, system 100 may apply the hash function 138 to each data point in dataset 116, e.g., data point 116a through data point 116n, to determine a vertex of each data point. In addition, system 100 may apply the hash function 138 to each data point in dataset 116 to determine a hash value 152 for each respective data point in dataset 116. In some embodiments, system 100 may associate the hash value 152 with the respective data point in dataset 116, for example by performing a join operation. In addition, in some embodiments, the system 100 may associate the vertex of each respective data point in dataset 116, for example, by performing a join operation on the data.

Based on applying the hash function 138 to dataset 116, the system 100 may determine a hash value 152 for each respective data point in dataset 116. The hash value 152 of each respective data point in dataset 116 may be based on the locality of the respective data point as determined based on the vertex. As the hash value 152 is based on the locality of the data points, points that are nearby each other may include the same hash value 152. In this regard, the hash value 152 is a probabilistic determination of an increased likelihood of collisions between points having the same hash value based on the locality of the point. Referring the FIG. 3, for dataset 116, the system 100 may determine hash value 152a through hash value 152n for each respective data point 116a through data point 116n. In some embodiments, the hash value 152a through hash value 152n may collectively be referred to as hash values 152.

Figure 4:
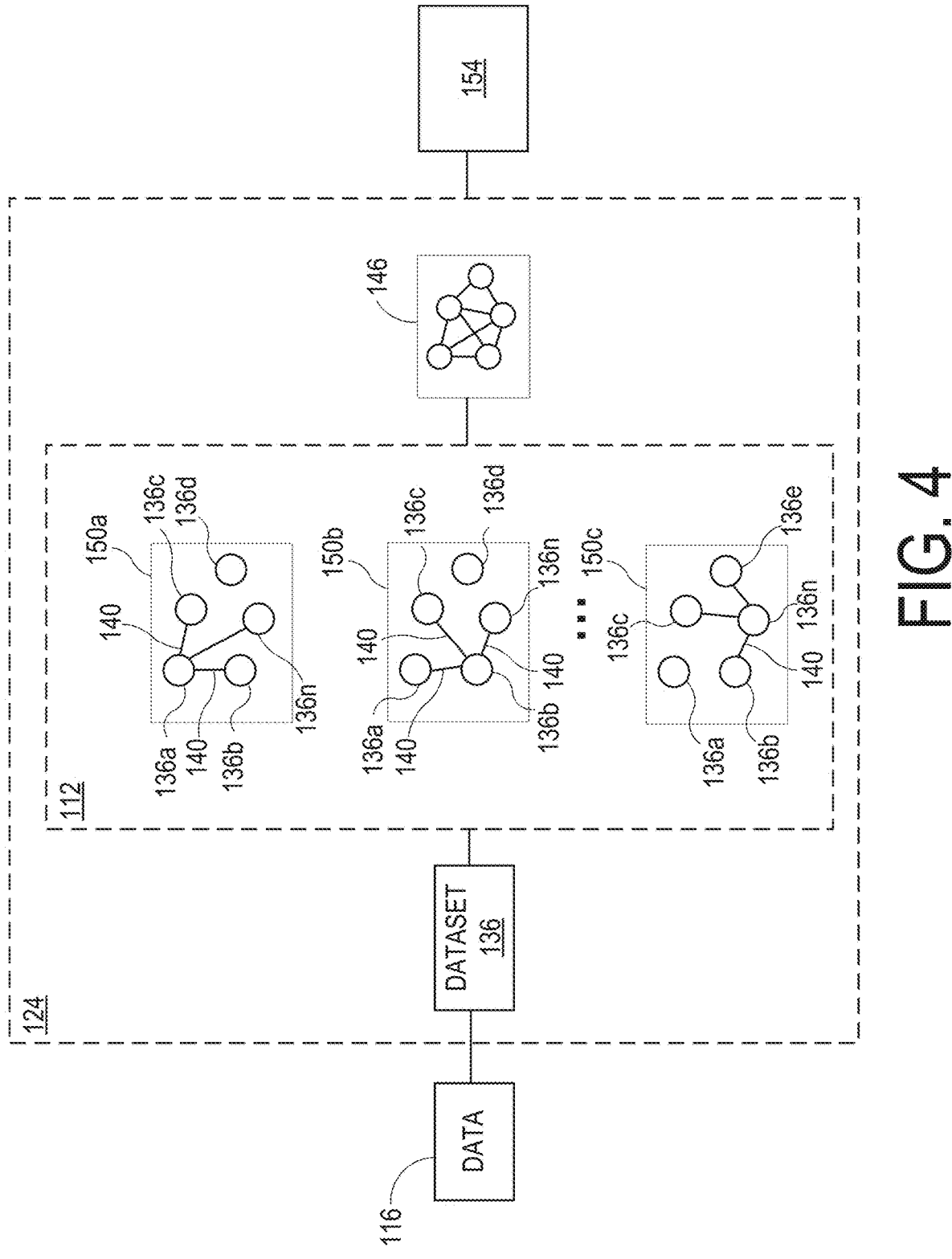
FIG. 4 depicts a block diagram of a portion of the system of FIG. 1, according to some embodiments.

According to some embodiments, the system 100 may then associate the hash values 152 with the respective data point in dataset 116. In some embodiments, as shown in FIG. 4, the system 100 may associate the hash value 152 with the respective data point in dataset 116 by performing join operation 134 on the data.

The system 100 may classify the data points in dataset 116 into the collection of buckets 122. In some embodiments, the system 100 may classify the data points in dataset 116 into respective buckets of the collection of buckets 122 based on the hash value.

As shown in FIG. 3, the collection of buckets 122 includes bucket 124a through bucket 124n, which may collectively be referred to as buckets 124, according to some embodiments. The data point 116a includes hash value 152a associated therewith and is thereby allocated to bucket 124b, data point 116b includes hash value 152b associated therewith and is thereby allocated to bucket 124d, and data point 116c and data point 116d include hash value 152c associated therewith and are allocated to bucket 124c. Accordingly, each respective buckets 124 of the collection of buckets 122 include a set of data allocated thereto based on the respective hash value and based on the data having an increased probability of collisions between the respective data points.

The system 100 includes, for example, computing device 112a and 112b, which may be collectively referred to as computing device 112. Each bucket 124 of the collection of buckets 122 having associated therewith a corresponding computing device 112 for performing one or more processing operations such as determining one or more attributes for each data point 136. In some embodiments, each bucket 124 of the collection of buckets 122 may have associated therewith computing device 112. In other embodiments, each bucket 124 of the collection of buckets 122 may have associated therewith one or more computing devices such as computing device 112.

It is to be appreciated that the number of computing device 112 associated with each bucket 124 is not static and may be dynamically configured based on a processing demand. In some embodiments, the number of computing device 112 associated with a particular bucket 124 may be a fixed number of computing device 112. Accordingly, in some embodiments, to limit a capacity threshold from being exceeded for the respective bucket 124, the hashing may allocate a close grouping of points to one or more bucket 124 of the collection of buckets 122 to limit reaching or exceeding a processing threshold of the corresponding computing device 112.

FIG. 4 illustrates a block diagram of a portion of the system 100, according to some embodiments.

The system 100 is configured to receive a large dataset such as dataset 116. For example, the dataset 116 includes 10 million data points of high feature data associated with an entity. In another example, the dataset 116 includes 40 million data points of high feature data. In yet another example, the dataset 116 includes 400 million data points of high feature data. Based on the hash value of each respective data point in dataset 116, the respective data point is allocated to one of the collection of buckets 122.

Operations for determining a graph cluster may be performed at a respective bucket of the collection of buckets 122. The graph cluster may be determined based on data from dataset 116 allocated to the respective bucket of the collection of buckets 122. In the respective bucket, one or more of the computing devices 112 may be associated therewith. The computing devices 112 may be utilized to perform the operations in the respective bucket, as will be further described herein.

Referring to FIG. 4, a bucket 124 of the collection of buckets 122 is shown, the bucket 124 including a dataset 136 associated therewith. The dataset 136 may correspond to one or more data points from dataset 116 allocated to the bucket 124 based on the hash value of each of the data points. In some embodiments, the dataset 136 may include data point 136a, data point 136b, data point 136c, data point 136d, and through data point 136n. In bucket 124, each respective data point in dataset 136 corresponding to vertices associated with dataset 116. In this regard, the system 100 allocates the data points in dataset 136 to bucket 124 based on the hash value associated with each respective data point in dataset 136, the bucket 124 being one bucket of the collection of buckets 122.

In some embodiments, the system 100 may perform the one or more processing operations on the dataset 136. In other embodiments, the computing device 112 may perform the one or more processing operations on the dataset 136. In some embodiments, the system 100 may direct computing device 112 to process the dataset 136 to enable the system 100 to perform the cluster identification and to identify patterns from the data based on the clustering.

Edges 140 between the data points in the dataset 136 may be determined. In some embodiments, the edges 140 may be determined between data points (e.g., vertices) that are within a distance parameter (e.g., distance threshold). Determining the edges for the data points based on allocation of the data points to a particular bucket such as, for example, bucket 124 provides for improved distribution of processing resources rather than performing similar operations on a single dataset that may include unrelated groups of data, thereby eliminating determining the vertices and edges for the entire dataset using a limited number of processing resources. For example, a dataset having 1 million data points includes determining vertices for each of the data points and the edges between each of the data points, which can exceed the processing capabilities of the system 100 and computing device 112 or lead to bottlenecking due to the high processing demands. It is to be appreciated by those having skill in the art that the number of data points in dataset 116 is not intended to be limiting and may include more or less data points in accordance with the present disclosure. For example, the dataset 116 may include over 10 million data points of high feature data. In other embodiments, for a given data point in the dataset 136, the edges that connect the given data point to the other data points in dataset 136 may be determined as part of the allocation of the dataset 136 to bucket 124.

The system 100 may determine a degree 150 for each data point in dataset 136. The degree 150 corresponds to the number of edges that are connected to a given data point (e.g., seed), and in which the edges are within the threshold (or less than the distance threshold). Each one of the edges 140 thereby connects the given data point to another data point in the dataset 136. In some embodiments, the system 100 may, for each of the data points 136a through 136n in dataset 136, determine the degree for each of the data points 136a through 136n. For example, as shown in FIG. 4, the system 100 determines degree 150a for data point 136a, degree 150b for data point 136b, and through degree 150n for data point 136n in dataset 136.

Each bucket of the collection of buckets 122 may include a computing device such as, for example computing device 112 associated therewith for performing one or more processing tasks. Referring to FIG. 4, the bucket 124 may include computing device 112 associated therewith. In some embodiments, the bucket 124 may include one or more of the computing devices 112 associated therewith. The operations at the respective bucket 124 of the collection of buckets 122 may be performed by the computing device 112. That is, in some embodiments, the computing device 112 may determine the edges 140 between the vertices in the dataset 136. In some embodiments, the computing device 112 may also determine the degree for each of the vertices in the dataset 136. In other embodiments, the bucket 124 may include one or more computing devices 112 for performing the processing tasks. In this regard, the processing tasks at the respective bucket 124 can be distributed across the one or more processing resources of the computing device 112, thereby reducing a processing demand on any one of the one or more computing device 112.

The system 100 and the computing device 112 may perform a join operation 146. In some embodiments, the join operation 146 is configured to associate the enrich the features associated with the data points in the dataset 136 with the data corresponding to the degree 150 determined for each vertex in dataset 136. In this regard, the dataset 136 may include the data points 136a through 136n, and each data point may have associated therewith edge data corresponding to the edges 140 (e.g., set of attributes) connecting each respective data point to one or more of the other data points in the dataset 136 in the bucket 124. As such, the system 100 may include a data table including the dataset 136 in bucket 124 and the data corresponding to the edges 140. The join operation 146 may then join the degree data determined for each of the vertices in dataset 136 with the other attributes to enable the system 100 to further perform the cluster identification as described herein. In this regard, the join operation 146 may associate the edges 140, the degrees 150, other feature data, or any combinations thereof, with the corresponding data points in dataset 136. In addition, in some embodiments, the system 100 may then remove any irrelevant edges from the data table for the dataset 136 to enable the system 100 to determine a directed graph where each tree of the graph presents a cluster.

For each respective bucket of the collection of buckets 122, the system 100 may identify a corresponding cluster 154. The cluster 154 may be determined based on the dataset corresponding to the one or more data points allocated to the respective bucket 124 and based on a threshold. In some embodiments, the threshold includes a distance parameter. In other embodiments, the threshold includes a number of edges within the distance parameter (e.g., minPts). The cluster 154 may also be determined based on the data joined with the dataset. In some embodiments, the joined data from which the cluster 154 may be determined includes the edge data associated with each data point in the respective bucket. In other embodiments, the joined data from which the cluster may be determined includes the source degree data associated with each data point in the respective bucket. For example, the cluster may include one or more data points that are allocated to the respective bucket in which the respective degree value for each data point exceeds the threshold.

Referring to FIG. 4, the cluster 154 for bucket 124 is determined by system 100 based on the dataset 136. In some embodiments, the cluster 154 for bucket 124 may be determined based on the one or more data points in dataset 136 and the data associated therewith. In some embodiments, the cluster 154 may be determined based on the processing tasks performed by the computing device 112. That is, in some embodiments, the cluster 154 may be determined based on the processing operations performed by the computing device 112 on the dataset 136 allocated to bucket 124. According to some embodiments, the cluster 154 may be determined based on the dataset 136. In other embodiments, the cluster 154 may be determined based on data joined with the dataset 136. In this regard, a join operation 146 may be performed using the data corresponding to the edges 140 and/or the degree 150 associated with each seed data point in dataset 136. In some embodiments, the join operation 146 joins the edge 140 data with the dataset 136. In other embodiments, the join operation 146 joins the degree 150 data with the dataset 136. The system 100 thereby determines the cluster 154 based on the data associated with the dataset 136 in the bucket 124, e.g., the one or more joined data tables associated with the dataset 136 in bucket 124.

The system 100 identifies the cluster 154 based on the threshold. In some embodiments, the cluster 154 may be determined based on applying one or more algorithms to the joined data, the one or more algorithms determining the cluster 154 based on the threshold. In some embodiments, the cluster 154 includes one or more data points from dataset 136 that are allocated to the respective bucket 124 and which exceeds the threshold. In other embodiments, the cluster 154 includes one or more data points from dataset 136, the data points being determined based on the degree 150 value associated with the respective data point exceeding the threshold. In some embodiments, the threshold value may correspond to a number of other data points around the particular data point that is within a distance parameter of the data point. For example, the cluster 154 may include the data points from dataset 136 where the corresponding degree 150 associated with the data point exceeds a threshold value of 6. In some embodiments, the threshold value or values may be determined by the entity. In other embodiments, the threshold value may be defined by the entity. For example, the threshold value may be periodically refined based on the patterns being determined from the dataset 116.

Accordingly, the various embodiments described herein provide for the system 100 to obtain the dataset 116 and identify one or more patterns from the dataset 116 based on the application of the methods and techniques as described herein. As such, by utilizing the hashing techniques to allocate the data points in dataset 116 to the collection of buckets 122 to increase a probability of collisions between the data points in each respective bucket 124, the entity may be capable of performing the cluster identification techniques in accordance with the present disclosure on large datasets having high number of features without having to expel additional resources to manually curate the data for a specific use application or to classify the data into one or more likely cluster groups prior to inputting the dataset 116 into the system 100. As such, the various embodiments described herein improve on the operation of the system 100, such as a computing device, by optimally configuring the distribution of data between a plurality of partitioned processing resources to perform a cluster identification on the dataset 116 while improving the latency for the system 100 to process such operations and by limiting the occurrence of processing bottlenecks in the system 100 or computing device 112 due to performing processing operations on too large a dataset. Furthermore, the system 100 can leverage one or more machine learning models to perform the clustering identification in order to iteratively improve the hashing functionality by improving the probabilistic determination of the likelihood of crash occurrences in data and for performing the attribute determination and cluster identification processes. Moreover, the system 100 can also leverage the machine learning models to improve the cluster identification on newly acquired data based on being trained on historical data and for applying newly acquired data for identifying novel cluster groups based on the features associated with the new data.

The clustering identification techniques of the system 100 therefore allow an entity to identify patterns from the system 100. For example, the system 100 may process the data to identify patterns associated with different risk factors as defined by the entity such as bot identification, identity theft, credit card theft, or fraudulent transactions. In another non-limiting example, the dataset 116 may be analyzed by the system 100 to identify patterns indicative of a network threat, such as unauthorized access, distributed denial of service (DDOS) attacks, or the like. In other examples, the dataset 116 may be applied to the system 100 to identify customer retail patterns based on user behavior data.

FIG. 5 illustrates a non-limiting example flow chart of a computer-implemented method 200, according to some embodiments.

At 202, the method 200 may include determining a set of first attributes for a first dataset. In some embodiments, the method 200 includes performing a first join operation based on the set of first attributes. The first dataset including a plurality of data points corresponding to a plurality of vertices, each vertex corresponding to a locality of a respective data point such as, for example, in a graphical space. The first dataset may include a plurality of data points, each data point having associated therewith one or more features. In some embodiments, the method 200 may include determining a vertex for each respective data point in the first dataset based on the features associated with the respective data point. Referring to FIG. 4, the first dataset is shown as dataset 116.

In some embodiments, determining the set of first attributes for the first dataset further includes determining a set of hash values for the plurality of vertices in the first dataset. Each hash value is determined based on applying one or more hash functions to each data point of the first dataset. The one or more hash functions may be applied to each data point in the first dataset to determine a hash value. Each hash value of the set of hash values thereby corresponding to a location of a respective vertex of the plurality of vertices. In some embodiments, the hash values may correspond to the location of the respective data point (e.g., vertex) in a space, the space including the other data points of the first dataset. In this regard, in some embodiments, each vertex may correspond to a position of the data point of the first dataset in a multi-axial graphical representation (e.g., 3-axis graph) also having the other data points of the first dataset distributed therethrough.

In addition, in some embodiments, the hash values may be indicative of a probability of collision with other vertices in the first dataset. In some embodiments, the first set of attributes includes a set of hash values, and each data point (or vertex) may be associated with a respective hash value. In other embodiments, the first set of attributes is a set of hash values. In some embodiments, the first set of attributes may include the vertex associated with each respective data point and the respective hash value. Referring to FIG. 3, the set of hash values are shown as hash values 152.

At 204, the method 200 includes classifying the first dataset to a collection of buckets based on the set of first attributes. By allocating the data points in the first dataset to a respective bucket of the collection of buckets, a likelihood of a probability of collisions between the data points in the respective buckets is increased. In this regard, each respective bucket of the collection of buckets includes one or more data points (or vertices) of the plurality of data points of the first dataset.

Allocating the data points to the collection of buckets also distributes a processing load for performing a pattern identification (e.g., clustering) across a plurality of processing resources partitioned across the collection of buckets. That is, in some embodiments, each respective bucket includes one or more processing units of a plurality of processing units. In addition, the one or more processing units are partitioned to the respective bucket to distribute the processing load for performing operations at the respective bucket on the data allocated thereto such as, but not limited to, applying one or more functions to the data, determining hash values, edges, source degree (e.g., degree), performing join operations on the determined attributes, cluster identification, and the like.

According to some embodiments, the method 200 may further include partitioning the one or more data points allocated to a respective bucket of the collection of buckets to one or more processing units of a plurality of processing units to distribute a processing load. In other embodiments, the partitioning may further include partitioning the one or more data points allocated to a respective bucket to a processing unit of the one or more processing units associated with the respective bucket to distribute the processing load. For example, a processing of a first group of data points at the bucket may be performed by a first processing unit and the processing of a second group of data points at the bucket may be performed by a second processing unit. For example, the respective processing unit may perform the one or more join operations for the data associated therewith. In some embodiments, the first dataset may be allocated to the collection of buckets based on the hash value. In other embodiments, at a respective bucket, the data points may be allocated to the one or more processing units based on the hash value. The collection of buckets is shown as collection of buckets 122 in FIG. 3, the collection of buckets 122 including the bucket 124a through bucket 124n.

In some embodiments, the method 200 further includes applying a salting technique to the plurality of data points in the first dataset to determine a fourth set of attributes. In some embodiments, the method 200 further includes joining the fourth set of attributes with the first dataset and the set of first attributes. In some embodiments, the one or more data points in the respective bucket are allocated to the one or more processing units based on the fourth set of attributes. Referring to FIG. 3, the salting technique may be performed during the hash function 138.

At 206, the method 200 includes determining a set of second attributes and perform a second join operation on the set of second attributes to generate a second dataset. In some embodiments, the set of second attributes may include a set of source degrees for the data points in the bucket. The source degree corresponding to a number of edges connecting a particular vertex (or data point) to the other vertices (or data points). In some embodiments, the source degree may be determined for the data points in the bucket. For example, a data point may include eight edges connecting the data point to eight other data points in the bucket, and the set of second attributes may be the source degree for each data point in the bucket.

The source degree associated with each respective data point in the bucket and corresponding to the number of edges connecting the data point to the other data points in the bucket may be determined based on a threshold. That is, for the respective data point, the source degree are those edges that are within or less than the threshold. In some embodiments, the threshold may be a radius distance. In other embodiments, the threshold may be based on a distance parameter with the respective data point being the focal point. In this regard, the source degree corresponds to the number of edges that connect the respective data point to other data points in the bucket, and in which the other data point is within the threshold. The source degree is shown as degree 150a for data point 136a and degree 150b for data point 136b in FIG. 4. The second join operation is shown as join operation 146 in FIG. 4.

In some embodiments, the method 200 may include determining the set of second attributes for a respective bucket of the collection of buckets. That is, for each respective bucket, the method 200 may include determining a respective set of second attributes for the data points allocated to the respective bucket. As each bucket of the collection of buckets is associated with one or more computing devices. In addition, each computing device includes one or more processors for performing a processing operation on the data allocated to the respective bucket. In some embodiments, the processing operations may include, but is not limited to, determining the set of second attributes. Accordingly, the computing device or devices associated with the respective bucket may be utilized to determine the set of second attributes.

In some embodiments, the method 200 includes performing a second join operation on the vertices and the second set of attributes to generate a second dataset. The join operation therefore associates the second set of attributes to each corresponding data point allocated to the respective bucket.

According to some embodiments, the method 200 may include determining, based on a second threshold, a set of third attributes. The set of third attributes corresponding to edges connecting a respective vertex of the one or more vertices to other vertices of the one or more vertices in the respective bucket. For example, an edge may connect a vertex with another vertex. In some embodiments, the second attributes may include the edges connecting the data points in a respective bucket with each other. In addition, the one or more edges in the set of second attributes may be based on a threshold, according to some embodiments. That is, the set of second attributes may include those edges connecting the data points that are less than a distance parameter, and in which the edges that exceed the threshold are not associated with the respective data points or data pairs. The edges are shown as edge 140 in FIG. 4.

In some embodiments, the first dataset may be allocated to the collection of buckets based on the edges associated with each respective vertex. That is, in some embodiments, one or more vertices of the plurality of vertices in the first dataset are allocated to the respective bucket of the collection of buckets based on the set of third attributes. The edges connecting the respective vertex and other vertices in the first dataset may be determined, for example, as part of determining the hash value. For example, in determining which bucket to allocate a group of vertices in a high-density area, the edges connecting between the nearest neighbors in the group of vertices may be determined during the allocation determination to enable determining which bucket of the collection of buckets to allocate the vertices.

In addition, in some embodiments, the method 200 may further include performing a join operation on the first dataset and the edge data to associate the edges connecting the vertices in the first dataset with one or more vertices in the first dataset. In other embodiments, the method 200 may further include performing a join operation on the vertices (or data points) in the respective bucket and the edge data determined for the vertices in the bucket to associate the edges connecting the vertices to the dataset of the respective bucket. The edges are shown as edges 140 in FIG. 4.

At 208, the method 200 includes determining a cluster based on applying a first threshold to the second dataset. In some embodiments, the cluster including one or more respective vertices in the second dataset exceeding the first threshold. In some embodiments, the cluster may be determined based on applying a neural network model to the data allocated to the respective bucket. In some embodiments, the neural network model applies one or more algorithmic functions to the data in the bucket to determine the cluster based on one or more parameters.

In some embodiments, the first threshold corresponds to a number of vertices within a distance parameter of a given vertex, and the cluster may correspond to those data points in the respective bucket having a source degree that is greater than the first threshold. For example, the first threshold may limit the data points to those connected to at least five other data points in the bucket, and the cluster may be determined from those data points in the bucket having a respective source degree value greater than five. That is, the cluster is formed from those data points including five or more edges connecting with the other data points in the bucket.

In some embodiments, the cluster may be formed by extracting one or more vertices from the collection of buckets based on the second set of attributes and a threshold. That is, in the respective bucket, one or more vertices may be identified as not being part of the cluster due to the location of the vertex being too remote relative to the other vertices in the bucket (e.g., source degree is less than the first threshold). As such, the threshold may be applied to the dataset allocated to the bucket following the source degree determination, where the vertices in the bucket having a source degree value less than the threshold value are thereby extracted from the second dataset. As such, the extracted vertices correspond to outlier vertices, and the cluster formed from the remaining vertices effectively corresponds to a directed graph cluster.

In some embodiments, the method 200 includes grouping the vertices remaining in the collection of buckets into one or more clusters based on the first set of attributes and the second set of attributes. For each bucket 124 of the collection of buckets 122, the remaining dataset 136 effectively represent a cluster group indicative of a data pattern. In this regard, each bucket 124 effectively is representative of a directed graph, where each bucket 124 represents a cluster. Accordingly, the collection of buckets 122 corresponds to a forest, or group of trees, which are effectively each a cluster. In some embodiments, the data corresponding to a particular cluster may be allocated between one or more of the bucket 124. For example, for high density areas, the data points in this high-density area may be distributed between one or more bucket 124 to more uniformly partition the data amongst the processing resources and to limit the likelihood of the computing device 112 becoming bottlenecked from the processing load exceeding the capabilities of the computing device 112.

Figure 6:
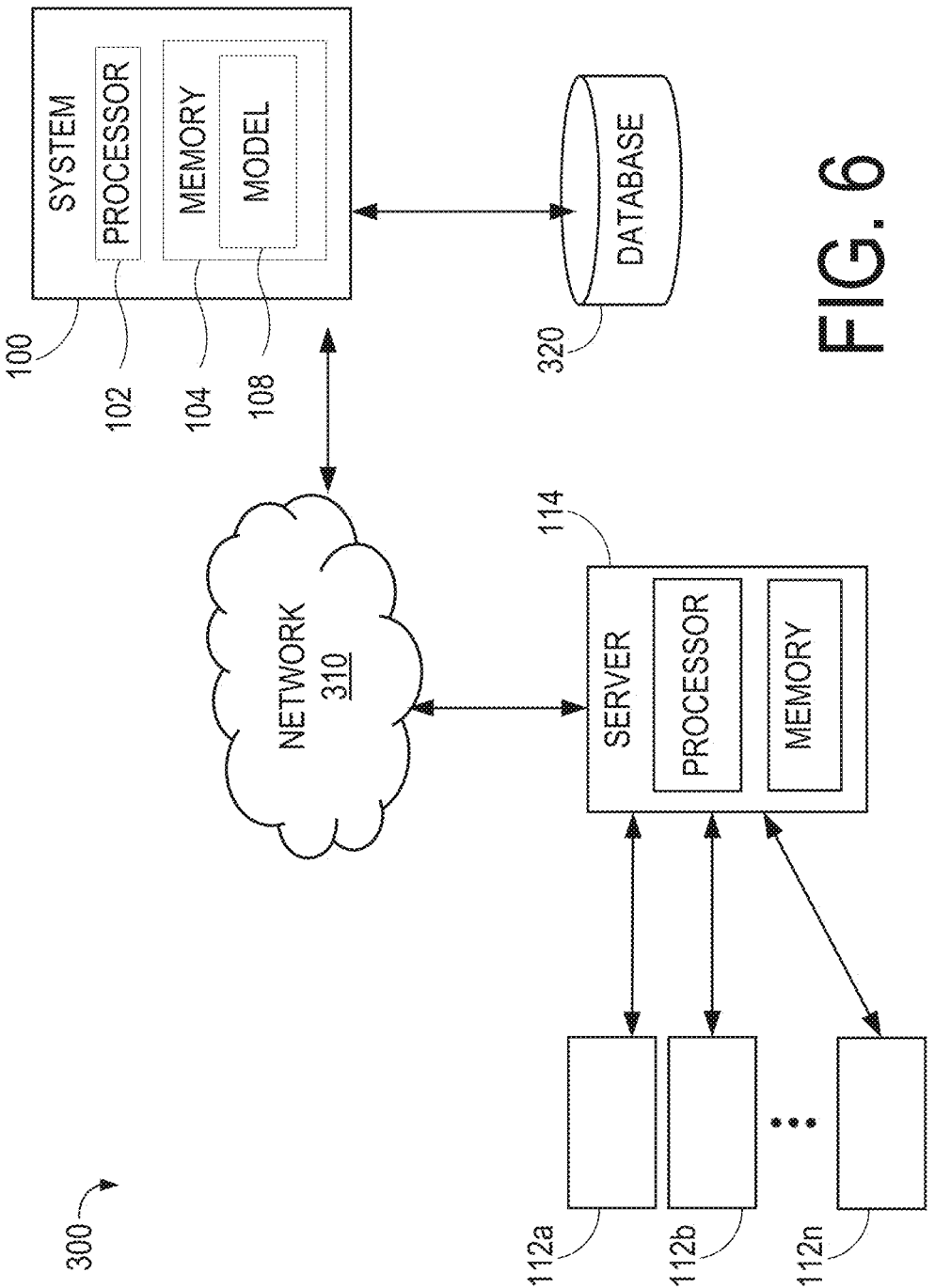
FIG. 6 depicts a block diagram illustrating an example network-based system, according to some embodiments.

FIG. 6 depicts a block diagram illustrating a network based system 300, according to some embodiments.

Not all of these components may be required to practice one or more embodiments, and variations in the arrangement and type of the components may be made without departing from the spirit or scope of various embodiments of the present disclosure. In various embodiments, the network based system 300 may include the system 100. The system 100 may be in communicable connection with a network 310 to send and receive information corresponding to one or more datasets with one or more other computing devices in communicable connection with the network 310. In some embodiments, the one or more datasets may include data corresponding to vertices, edges, degrees, entry, probability of collisions, hash value, other data, or any combinations thereof. In some embodiments, the one or more other computing devices may correspond to the collection of buckets. For example, in some embodiments, each bucket of the collection of buckets 122 may include one or more computing devices that receive one or more datasets corresponding to data allocated to the respective bucket and processes said data in accordance with this disclosure.

In some embodiments, the network based system 300 may include the computing device 112. As shown in FIG. 6, the system 100 may be in communicable connection with computing device 112*a* through 112*n* through network 310 to send and receive data between system 100 and the respective one of the computing device 112 for performing the cluster identification including the edge and source degree determination. For example, in some embodiments, the computing device 112 may receive a dataset based on the allocation of the dataset to one of the bucket 124 of the collection of buckets 122 and the respective computing device 112 being associated to that particular bucket 124.

In some embodiments, the system 100 and the computing device 112 may be any type of processor-based platforms that are connected to a network 310 such as, without limitation, servers, personal computers, digital assistants, personal digital assistants, smart phones, pagers, digital tablets, laptop computers, Internet appliances, cloud-based processing platforms, and other processor-based devices either physical or virtual. In some embodiments, the system 100 and the computing device 112 may be specifically programmed with one or more application programs in accordance with one or more principles/methodologies detailed herein. In some embodiments, the system 100 and the computing device 112 may be specifically programmed with the Model component 108 in accordance with one or more principles/methodologies detailed herein. In some embodiments, the system 100 and the computing device 112 may operate on any of a plurality of operating systems capable of supporting a browser or browser-enabled application, such as Microsoft™, Windows™, and/or Linux.

In some embodiments, the computing device 112 shown may at least include a computer-readable medium, such as a random-access memory (RAM) or FLASH memory, coupled to a processor. In some embodiments, examples of the computing device 112 may be any type of processor-based platforms that are connected to a network 310 such as, without limitation, servers, personal computers, digital assistants, personal digital assistants, smart phones, pagers, digital tablets, laptop computers, Internet appliances, cloud-based processing platforms, and other processor-based devices. In some embodiments, the computing device 112 may be specifically programmed with one or more application programs in accordance with one or more principles/methodologies detailed herein. In some embodiments, the computing device 112 may operate on any of a plurality of operating systems capable of supporting a browser or browser-enabled application, such as Microsoft™, Windows™, and/or Linux. In some embodiments, the computing device 112 shown may be accessed by, for example, the system 100 by executing a browser application program such as Microsoft Corporation's Internet Explorer™, Apple Computer, Inc.'s Safari™, Mozilla Firefox, and/or Opera to obtain the live data points. In some embodiments, through the system 100, the entity associated with the system 100 may communicate over the exemplary network 310 with the computing device 112 to obtain the live data points.

In some embodiments, the network based system 300 may include at least one database 320. The database 320 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the network based system 300 may also include and/or involve one or more cloud components. Cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, the computer-based systems/platforms, computer-based devices, components, media, and/or the computer-implemented methods of the present disclosure may be specifically configured to operate in or with cloud computing/architecture such as, but not limiting to infrastructure as a service (IaaS), platform as a service (PaaS), and/or software as a service (SaaS).

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing device (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components and cloud servers are examples.

In some embodiments, as detailed herein, one or more of the computer-based systems of the present disclosure may obtain, manipulate, transfer, store, transform, generate, and/ or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/ public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

The machine learning model as described in the various embodiments herein can be any suitable computer-implemented artificial intelligence algorithm that can be trained (e.g., via supervised learning, unsupervised learning, and/or reinforcement learning) to receive input data and to generate output data based on the received input data (e.g., neural network, linear regression, logistic regression, decision tree, support vector machine, naive Bayes, and/or so on). In various aspects, the input data can have any suitable format and/or dimensionality (e.g., character strings, scalars, vectors, matrices, tensors, images, and/or so on). Likewise, the output data can have any suitable format and/or dimensionality (e.g., character strings, scalars, vectors, matrices, tensors, images, and/or so on). In various embodiments, a machine learning model can be implemented to generate any suitable determinations and/or predictions in any suitable operational environment (e.g., can be implemented in a payment processing context, where the model receives payment data, transaction data, and/or customer data and determines/predicts whether given transactions are fraudulent, whether given customers are likely to default, and/or any other suitable financial determinations/predictions, and/or so on).

The various embodiments described herein can improve computer performance by reducing the processing loads for datasets, thereby saving processor cycles, the number of required processors, memory usage, and power usage. Techniques herein can also improve computer performance by providing more efficient data processing models for identifying one or more clusters in a dataset based on a density of the data, as performed by the one or more processors and one or more machine learning models, leading to improved computing systems or networked computing systems that are implemented by one or more computing devices, servers, controllers, other computing devices, and the like, and thereby saving on processor cycles, memory usage, and power usage by those devices.

In some embodiments, a system including one or more processors and a non-transitory computer readable medium having stored thereon instructions that are executable by the one or more processors to cause the system to perform operations including: determine a set of first attributes for a first dataset and perform a first join operation based on the set of first attributes, the first dataset corresponding to a plurality of vertices; classify the first dataset to a collection of buckets based on the set of first attributes, wherein each respective bucket of the collection of buckets including one or more vertices of the plurality of vertices; determine, for a respective bucket of the collection of buckets, a set of second attributes and perform a second join operation on the set of second attributes to generate a second dataset; and determine a cluster based on applying a first threshold to the second dataset, the cluster including one or more respective vertices in the second dataset exceeding the first threshold.

In some embodiments, determining the set of first attributes for the first dataset further including determine a set of hash values for the plurality of vertices in the first dataset, each hash value of the set of hash values corresponding to a location of a respective vertex of the plurality of vertices.

In some embodiments, a hash value of the set of hash values is indicative of a probability of collision with other vertices in the first dataset.

In some embodiments, the system further performs operations including determine, based on a second threshold, a set of third attributes, the set of third attributes corresponding to edges connecting a respective vertex of the one or more vertices to other vertices of the one or more vertices in the respective bucket.

In some embodiments, the one or more vertices of the plurality of vertices is allocated to the respective bucket of the collection of buckets based on the set of third attributes.

In some embodiments, the set of second attributes corresponding to a degree for each respective vertex of the one or more vertices in the respective bucket, the degree corresponding to a number of edges connecting the respective vertex to the other vertices in the respective bucket.

In some embodiments, the first threshold corresponds to a minimum number of vertices within a distance parameter of a given vertex.

In some embodiments, each respective bucket includes one or more processing units of a plurality of processing units.

In some embodiments, the one or more processing units are partitioned to the respective bucket to distribute a processing load for performing one or more join operations on the plurality of vertices.

In some embodiments, a computer-implemented method including: obtaining, by a computing device, a first dataset including a plurality of data points; determining, by the computing device, a locality of each data point of the plurality of data points in a graphical space; determining, by the computing device based on a neural network model, a set of first attributes indicative of a probability of collisions between the plurality of data points based on their respective localities and perform a first join operation on the first dataset and the set of first attributes, the set of first attributes corresponding to an estimation of an increased probability of collisions between data points having a same hash value; classifying, by the computing device based on the set of first attributes, the first dataset to a collection of buckets based on the set of first attributes, wherein each respective bucket of the collection of buckets including one or more data points of the plurality of data points; partitioning, by the computing device, the one or more data points allocated to a respective bucket of the collection of buckets to one or more processing units of a plurality of processing units to distribute a processing load for performing one or more join operations; determining a set of second attributes for the one or more data points allocated to the respective bucket and performing a second join operation on the data points and the set of second attributes to generate a second dataset; determining, at the respective bucket, a cluster based on applying a first threshold to the second dataset, the cluster including one or more respective data points in the second dataset exceeding the first threshold; and grouping the data points in the collection of buckets into one or more respective clusters based on the set of second attributes and based on the first threshold.

In some embodiments, determining the set of first attributes for the first dataset further including determine a set of hash values for the plurality of data points in the first dataset, each hash value of the set of hash values corresponding to a location of a respective data point of the plurality of data points.

In some embodiments, a hash value of the set of hash values is indicative of a probability of collision with other data points in the first dataset.

In some embodiments, the method further including determine, based on a second threshold, a set of third attributes, the set of third attributes corresponding to edges connecting a respective data points of the one or more data points to other data points of the one or more data points in the respective bucket.

In some embodiments, the one or more data points of the plurality of data points is allocated to the respective bucket of the collection of buckets based on the set of third attributes.

In some embodiments, the set of second attributes corresponding to a degree for each respective data points of the one or more data points in the respective bucket, the degree corresponding to a number of edges connecting the respective data points to the other data points in the respective bucket.

In some embodiments, the first threshold corresponding to a minimum number of data points within a distance parameter of a given data points.

In some embodiments, the method further including: applying, by the computing device, a salting technique to the plurality of data points in the first dataset to determine a fourth set of attributes; and joining, by the computing device, the fourth set of attributes with the first dataset and the set of first attributes. In some embodiments, the one or more data points in the respective bucket are allocated to the one or more processing units based on the fourth set of attributes.

In some embodiments, a non-transitory computer readable medium having stored thereon instructions executable by a processor of a computing device to cause the computing device to perform operations including: determine a set of first attributes for a first dataset, the first dataset corresponding to a plurality of vertices and the set of first attributes corresponding to a location of each respective vertex of the plurality of vertices; perform a first join operation based on the set of first attributes; classify the first dataset to a collection of buckets based on the set of first attributes, wherein each respective bucket of the collection of buckets including one or more vertices of the plurality of vertices; determine, for a respective bucket of the collection of buckets, a set of second attributes and perform a second join operation on the set of second attributes to generate a second dataset, the set of second attributes corresponding to a degree value representative of a number of edges connecting a respective vertex to other vertices in the respective bucket; determine a cluster based on applying a first threshold to the second dataset, the cluster including one or more respective vertices in the second dataset exceeding the first threshold; and group the vertices in the collection of buckets into one or more respective clusters based on the set of second attributes and based on the first threshold; wherein the first threshold corresponds to a minimum number of vertices within a distance parameter of a given vertex.

In some embodiments, the set of first attributes includes a set of hash values, each hash value of the set of hash values is indicative of a probability of collision with other vertices in the first dataset.

In some embodiments, the computing device further performs operations including: determine, based on a second threshold, a set of third attributes, the set of third attributes corresponding to edges connecting a respective vertex of the one or more vertices to the other vertices of the one or more vertices in the respective bucket; wherein the one or more vertices of the plurality of vertices is allocated to the respective bucket of the collection of buckets based on the set of third attributes.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

What is claimed is:

1. A system comprising:
one or more processors; and
a non-transitory computer readable medium having stored thereon instructions that are executable by the one or more processors to cause the system to perform operations comprising:
    determine a set of first attributes for a first dataset and perform a first join operation based on the set of first attributes, the first dataset comprising a plurality of data points, each of the plurality of data points corresponding to a respective vertex of a plurality of vertices;
    classify each vertex of the plurality of vertices in the first dataset to a respective bucket in a collection of buckets based on the first attributes associated with the plurality of vertices, whereby each respective bucket of the collection of buckets comprises one or more vertices of the plurality of vertices having similar first attributes;
    determine, for a respective bucket of the collection of buckets, a set of second attributes and perform a second join operation on the set of second attributes to generate a second dataset; and
    determine a cluster based on applying a first threshold to the second dataset, the cluster comprising one or more respective vertices of the plurality of vertices in the second dataset exceeding the first threshold.

2. The system of claim 1, wherein determining the set of first attributes for the first dataset further comprising:
    determine a set of hash values for the plurality of vertices in the first dataset, each hash value of the set of hash values corresponding to a location of a respective vertex of the plurality of vertices.

3. The system of claim 2, wherein a hash value of the set of hash values is indicative of a probability of collision with other vertices in the first dataset.

4. The system of claim 1, wherein the system further performs operations comprising:
    determine, based on a second threshold, a set of third attributes, the set of third attributes corresponding to edges connecting a respective vertex of the one or more vertices to other vertices of the one or more vertices in the respective bucket.

5. The system of claim 4, wherein the one or more vertices of the plurality of vertices is allocated to the respective bucket of the collection of buckets based on the set of third attributes.

6. The system of claim 4, wherein the set of second attributes corresponding to a degree for each respective vertex of the one or more vertices in the respective bucket, the degree corresponding to a number of edges connecting the respective vertex to the other vertices in the respective bucket.

7. The system of claim 1, wherein the first threshold corresponds to a minimum number of vertices within a distance parameter of a given vertex.

8. The system of claim 1, wherein each respective bucket comprises one or more processing units of a plurality of processing units.

9. The system of claim 8, wherein the one or more processing units are partitioned to the respective bucket to distribute a processing load for performing one or more join operations on the plurality of vertices.

10. A computer-implemented method comprising:
    determining a set of first attributes for a first dataset and perform a first join operation based on the set of first attributes, each of the set of first attributes having a value characterizing a locality of a plurality of vertices;
    classifying each vertex in the plurality of vertices in the first dataset to a respective bucket in a collection of buckets based on the first attributes associated with the vertices, whereby each respective bucket of the collection of buckets comprises one or more vertices of the plurality of vertices having similar first attributes;
    determining, for a respective bucket of the collection of buckets, a set of second attributes and perform a second join operation on the set of second attributes to generate a second dataset, each of the set of second attributes having a value characterizing a source degree of each of the plurality of vertices; and
    determining a cluster based on applying a first threshold to the second dataset, the cluster comprising one or more respective vertices in the second dataset exceeding the first threshold.

11. The computer-implemented method of claim 10, wherein determining the set of first attributes for the first dataset further comprising:
    determining a set of hash values for the plurality of vertices in the first dataset, each hash value of the set of hash values characterizing a probability of collisions of a respective vertex with other vertices in a vector space.

12. The computer-implemented method of claim 10, further comprising:
    determining, based on a second threshold, a set of third attributes, each of the set of third attributes having a value characterizing an edge connecting a respective vertex of the one or more vertices to other vertices of the one or more vertices in the respective bucket;

wherein the one or more vertices of the plurality of vertices is allocated to the respective bucket of the collection of buckets based on the set of third attributes.

13. The computer-implemented method of claim 12, wherein the source degree characterizing a number of edges connecting the respective vertex to the other vertices in the respective bucket.

14. The computer-implemented method of claim 10, wherein the first threshold having a value characterizing a minimum number of vertices within a distance parameter of a given vertex.

15. The computer-implemented method of claim 10, wherein each respective bucket comprises one or more processing units of a plurality of processing units;

wherein classifying the first dataset to the one or more processing units partitioned to each respective bucket distributes a processing load for performing one or more join operations on the first dataset.

16. A non-transitory computer readable medium having stored thereon instructions that are executable by at least one processor of a computing device to cause the computing device to perform operations comprising:

determine a set of first attributes for a first dataset and perform a first join operation based on the set of first attributes, each of the set of first attributes having a value characterizing a locality of a plurality of vertices;

classify each vertex of the plurality of vertices in the first dataset to a respective bucket in a collection of buckets based on the first attributes associated with the vertices, whereby each respective bucket of the collection of buckets comprises one or more vertices of the plurality of vertices having similar first attributes;

determine, for a respective bucket of the collection of buckets, a set of second attributes and perform a second join operation on the set of second attributes to generate a second dataset, each of the set of second attributes having a value characterizing a source degree of each of the plurality of vertices; and determine a cluster based on applying a first threshold to the second dataset, the cluster comprising one or more respective vertices in the second dataset exceeding the first threshold.

17. The non-transitory computer readable medium of claim 16, wherein the computing device further performs operations comprising:

determine, based on a second threshold, a set of third attributes, each of the set of third attributes having a value characterizing an edge connecting a respective vertex of the one or more vertices to other vertices of the one or more vertices in the respective bucket;

wherein the one or more vertices of the plurality of vertices is allocated to the respective bucket of the collection of buckets based on the set of third attributes.

18. The non-transitory computer readable medium of claim 16, wherein the computing device further performs operations comprising:

determining a set of hash values for the plurality of vertices in the first dataset, each hash value of the set of hash values characterizing a probability of collisions of a respective vertex with other vertices in a vector space.

19. The non-transitory computer readable medium of claim 18, wherein the source degree characterizing a number of edges connecting the respective vertex to the other vertices in the respective bucket;

wherein the first threshold having a value characterizing a minimum number of vertices within a distance parameter of a given vertex.

20. The non-transitory computer readable medium of claim 16, wherein each respective bucket comprises one or more processing units of a plurality of processing units;

wherein classifying the first dataset to the one or more processing units partitioned to each respective bucket distributes a processing load for performing one or more join operations on the first dataset.

* * * * *